United States Patent [19]

Paixao et al.

[11] 4,176,159

[45] Nov. 27, 1979

[54] PROCESS FOR CONCENTRATION OF TITANIUM CONTAINING ANATASE ORE

[76] Inventors: Jose Marcio Jardim Paixao, Costa Pinto St., 170, Belo Horizonte, Minas Gerais; Paulo Ayres Falcao de Mendonca, Eng 2 Eranani Cotrim St., 86 Ap. 104, Rio de Janerio, both of Brazil

[21] Appl. No.: 917,072

[22] Filed: Jun. 19, 1978

Related U.S. Application Data

[63] Continuation-in-part of Ser. No. 741,625, Nov. 15, 1976, abandoned.

[51] Int. Cl.$^2$ .................. C01G 23/00; C01G 23/04
[52] U.S. Cl. .................. 423/80; 423/82; 423/84; 75/1 TI
[58] Field of Search .................. 423/69, 80, 82, 84; 75/1 TI, 1 R

[56] References Cited

U.S. PATENT DOCUMENTS

| | | | |
|---|---|---|---|
| 3,112,178 | 11/1963 | Judd | 423/80 |
| 3,252,787 | 5/1966 | Shiah | 75/1 TI |
| 3,257,198 | 6/1966 | Volk et al. | 75/1 TI |
| 3,660,029 | 5/1972 | Naguib | 423/80 |
| 3,784,670 | 1/1974 | Yamada et al. | 75/1 TI |
| 3,875,286 | 4/1975 | Robinson et al. | 423/82 |
| 3,903,239 | 9/1975 | Berkovich | 423/82 |
| 3,926,615 | 12/1975 | Leilach | 75/1 TI |
| 4,085,190 | 4/1978 | Shiah | 423/80 |

*Primary Examiner*—Herbert T. Carter
*Attorney, Agent, or Firm*—Emory L. Groff, Jr.

[57] ABSTRACT

The process basically consists of the removal of the impurities contained in titanium minerals, in which titanium is present in the form of oxides in complex association with other minerals which cannot be eliminated by the conventional hydro-metallurgical processes.

The conditioning of the mineral by pyro-metallurgical treatment followed by magnetic separation, removes a part of the magnetic impurities at the same time that it exposes those impurities to the action of leaching acids and thus makes it possible for them to be removed easily. The alkaline treatment following the acid leaching permits elimination of the phosphorus contained as a harmful impurity, and makes it possible to secure a product within the specifications of the consumer market for use as a raw material mainly for the obtention of pigments and metallic titanium, which are the main forms in which titanium ores enter into consumption.

4 Claims, No Drawings

PROCESS FOR CONCENTRATION OF TITANIUM CONTAINING ANATASE ORE

This application is a continuation in-part of Ser. No. 741,625, filed Nov. 15, 1976 and now abandoned.

BACKGROUND OF THE INVENTION

Titanium occurs in nature in many mineral forms. The most common minerals and those to which most of the conventional beneficiation and purification processes are directed are rutile, ilmenite and leucoxene ores.

Increased demands for rutile [$TiO_2$], which is not an abundant mineral, have presaged the development of efficient processes for upgrading low grade titanium ores such as ilmenite to produce products with characteristics similar to natural rutile, i.e., the so-called synthetic rutile containing more than 90% $TiO_2$.

In ilmenite and other common titanium ores, the titanium exists chemically combined in true chemical compound form as $FeO.TiO_2$. All of the conventionally employed upgrading methods require a heat treatment followed by an acid leach to reduce the compound and to remove impurities. Typical of such processes are those described in U.S. Pat. Nos. 3,252,787 (Shiah); 3,257,198 (Volk et al.); 3,784,670 (Yamada et al.); and 3,926,615 (Leilach et al.).

According to these patented processes, the ilmenite is first reduced at very high temperatures (about 1000° C.), sometimes under pressure, and in the presence of strong reducing agents. The purpose of the combination of high temperature and reducing agent is to break up the crystal lattice and composition of the ilmenite into $TiO_2$ and ferrous oxide and/or metallic iron. The latter are generally removed by various leaching steps leaving a rutile having a high content of $TiO_2$.

In the Leilach et al. patent a brookite type of material is obtained by the high temperature oxidation of ilmenite. Special precautions are taken during the heating step to avoid the formation of hematite crystals from the iron which is released from the ilmenite lattice during heating.

In about 1968 a new type of titanium ore, since named anatase, was discovered in Brazil in complex deposits known as alkaline pipes. In these deposits the titanium exists as $TiO_2$ in complex association with other minerals such as perovskite, various phosphates, limonite, magnetite, hematite, etc. It is to be understood that the titanium in anatase exists as a true oxide ($TiO_2$), although in association with other compounds, and not as a titanate ($FeO.TiO_2$) as in ilmenite. A typical analysis of anatase ore is as follows:

$TiO_2$—28%
Fe—38%
CaO—1%
MgO—<1%
$P_2O_5$—2%
$SiO_2$—1%

A typical petrographic analysis for the ore is as follows:

Anatase—18%
Hematite—25%
Ilmenite—2%
Limonite—2%
Apatite—<1%

Anatase is much more reactive during chlorination than the rutile form of $TiO_2$ due to the differences in crystal structure. It is desirable to maintain this reactivity of the anatase during processing of the ore.

Some of the contaminants in the ore may be removed by conventional mechanical beneficiation processes whereas others require more elaborate processing. Thus, by a combination of steps involving desliming, controlled grinding and magnetic separation, it is possible to obtain concentrates with $TiO_2$ contents of about 60-65%. If a flotation step is added, which requires a smaller particle size, mechanical concentrates of up to 80% $TiO_2$ can be obtained. A typical chemical and petrographic analysis of a mechanical concentrate without flotation is as follows:

$TiO_2$—83%
$P_2O_5$—1%
Fe—5%
Ca—<1%
$SiO_2$—<1%

TYPICAL PETROGRAPHIC ANALYSIS OF CONCENTRATE:
Anatase—84%
Hematite—4%
Silicates—1%
Phosphates—<1%

The latter is preferred over the concentrate obtained by flotation because it retains a coarser particle size distribution which is required in the industrial chloride process for manufacturing $TiO_2$ pigments, titanium sponge, etc.

Innumerable research efforts have been aimed at obtaining concentrates with a high content of $TiO_2$, starting with minerals other than ilmenite, in which the titanium is in the form of iron titanate. Attempts made so far have proved fruitless, taking as the starting point either minerals in which the titanium is in the form of titanates other than of iron, such as perovskite and titanite (sphene), or minerals in which the titanium is in the form of oxides, such as anathasium and brukite, in the natural form. With all of these experimental techniques, however, even when high contents of $TiO_2$ are obtained, the impossibility of removing impurities strongly associated with titanium did not permit the obtention of a final product suitable for marketing. The prohibitive prices of the attempted processes, in turn, discouraged any attempts at proceeding with studies in this respect.

Strict anti-pollution legislation in the developed and developing countries also created a greater demand for concentrates of minerals with a high content of titanium for the manufacture of pigments, a sector of the industry responsible for the consumption of about 75% of the titanium minerals produced in the world. This tendency is aimed at reducing or even eliminating the production of pollutant effluents, such as occurs mainly in the process of obtaining $TiO_2$ by the sulphate process using ilmenite as the raw material.

In the process for concentration of minerals as presently known, the main disadvantages are the need for using raw materials that meet certain specifications as regards content of impurities, especially phosphorus; the high temperatures at which reduction takes place; and the considerable consumption of leaching solution due to the low content of titanium dioxide ($TiO_2$) in the raw material.

The above-described mechanical concentrates of anatase are suitable for use in some methods for preparing pigments, etc. However, the presence of impurities such as phosphorous disqualifies them for use in the sulfate process. This last disadvantage has been circumvented with the recovery of the leaching solutions, but, even so, this approach calls for greater investment with consequent increases in the price of the concentrate so obtained.

The presence of alkaline and alkaline earth elements disqualifies them, in turn, for use in the manufacture of pigments by the chloride process, inasmuch as its chlorides, which have melting points in the range of operation of the chlorination reactors and do not volatilize within the latter, jeopardize the fluidized bed normally used in this process, or form residual products that are extremely detrimental to the operation of the equipment.

It is an object of the present invention to provide an efficient and inexpensive method for upgrading anatase or titanium ores or concentrates of similar composition.

SUMMARY OF THE INVENTION

As a raw material for the novel process of concentration according to the invention for obtaining products with a content of $TiO_2$ above 90%, use is made of the above-described anatase or similar mineral in which titanium is present as the oxide, although in complex association with impurities such as iron oxides, calcium, magnesium, phosphorous, aluminum, sodium and potassium.

The method of the invention for upgrading anatase, its concentrates or minerals of similar concentration comprises calcining the mineral in a non-reducing atmosphere at a temperature below that of rutilization, cooling and reducing the calcined mineral and subjecting the product to magnetic separation.

The presence of different types of $TiO_2$ containing materials is believed to be due to the process of formation of the deposit which is thought to have been through weathering of perovskite containing piroxenes.

The mechanical concentrate of anatase is heated to a temperature between 700°–900° C. in a non-reducing atmosphere. It is important to note that the concentrate discrete particles are made up of anatase crystals, which are $TiO_2$ crystals, with attachments of other minerals that cannot be removed mechanically. These attachments mainly comprise limonite, $FeO(OH)_x$.

Upon heating, the limonite is changed into hematite with loss of $H_2O$, as in the equation below:

$$nFeO(OH)_x \xrightarrow{Heat} (n/2)Fe_2O_3 + (x/2)H_2O$$

It is important to note that this reaction does not occur below 700° C. On the other hand, since anatase reacts faster with chlorine than rutile, the process temperature should be kept below 900° C. to avoid rutilization of the anatase.

This calcination step is to be distinguished from that required to break down ilmenite in the prior art methods. Therein it is necessary to reduce the titanate to ferrous oxide or metallic iron, a chemical conversion which differs markedly from that depicted above. The ilmenite reduction may be illustrated thusly:

$$3FeO \cdot TiO_2 \rightarrow Fe_2O_3 + Fe + 3TiO_2$$

However, the temperatures required to effect this breakdown result in the rutilization of the mineral.

After the calcination described above, the material is cooled down to about 500° C. and taken to a second kiln in which the concentrate is reduced at controlled temperatures between 400° C. and 600° C. in atmospheres containing at least 10% of gaseous reducing agent (CO or $H_2$). Under said conditions the hematite is transformed into magnetite according to the following reaction:

$$3Fe_2O_3 + CO \rightarrow 2Fe_3O_4 + CO_2$$

or $$3Fe_2O_3 + H_2 \rightarrow 2Fe_3O_4 + H_2O \quad (9)$$

It is critical to maintain the temperature and reducing conditions described above because the slow reduction of hematite is required to obtain large magnetite crystals. The large magnetite crystals, in turn, are necessary because:

(a) If the iron oxide is attached to the anatase crystal, the physical change in dimension releases the iron impurity from the anatase crystal.

(b) If the original limonite was included in the anatase crystal, the formation of a magnetite crystal larger than the original limonite one, will cause the anatase crystal to strain and break apart or develop cracks. In either case the original iron impurity can be removed by subsequent treatment, physical or chemical.

The reduced concentrate is then cooled down to below 200° C. in a protected atmosphere to prevent the reoxidation of magnetite.

After reduction and cooling, the material is submitted to a magnetic separation in the range of between 400 to 1500 gauss to remove the physically liberated material, which was mostly developed in the preceding heat treatment step. The anatase concentrate at this point averages about 86% $TiO_2$.

The remaining impurities at this stage are removed by chemical leach with a mineral acid which permits obtaining a final concentrate with a $TiO_2$ content of at least 90%.

In order to improve quality of the concentrate, an alkaline neutralization step is added. This permits the removal of a substantial amount of the phosphorus originally contained in the ore and which becomes adsorbed as $H_3PO_4$ on the surface of the anatase crystal during the acid leach step.

EXAMPLE 1

A mechanical concentrate of titanium mineral containing 81.64% of $TiO_2$ and 6.45% of total Fe, in a degree of fineness lower than 200 mesh, was taken to a rotary kiln and calcined at 750° for 30 minutes in an atmosphere of $CO_2$. After this treatment, the mineral was cooled to 500° C. and the $CO_2$ atmosphere was maintained. After reaching the 500° C. temperature, the mineral was reduced with a flow of reducing gas composed of 60% of N, 24% of $CO_2$ and 16% of CO, during a period of 45 minutes. The material was subjected to magnetic separation in humid medium, in a field of 600 gauss, which gave rise to two fractions, one magnetic, 10% of the original feed, with 40.71% of $TiO_2$ and 23.66% of total Fe, and one non-magnetic, with 86.66% of $TiO_2$ and 4.48% of total Fe. Recovery of $TiO_2$ in this operation was 95.5%.

The non-magnetic fraction was leached with HCl 200 g/l at 104° C., with stirring arrangements, during a period of 4 hours. Subsequent to this operation the concentrate was separated from the liquid phase by filtration and washed with water by decantation until the acid had been removed. The concentrate thus separated was treated with a solution of sodium hydroxide at 5% and then washed with water to remove the alkali. The results obtained appear in the following table:

TABLE 1

|  | Mechanical concentrate | Magnetic fraction | Non-magnetic fraction | Leached with HCl | Neutralization with NaOH |
|---|---|---|---|---|---|
| $TiO_2$,% | 81.64 | 40.71 | 86.66 | 90.31 | 90.03 |
| Total Fe, % | 6.45 | 23.63 | 4.48 | 2.24 | 2.38 |
| $P_2O_2$,% | 0.86 | 3.04 | 0.66 | 0.16 | 0.03 |
| $SiO_2$,% | 4.16 | 11.76 | 3.99 | 4.31 | 4.01 |
| CaO, % | 0.70 | 1.12 | 0.97 | 0.50 | 0.56 |
| MgO, % | 0.24 | 0.96 | 0.34 | 0.16 | 0.20 |
| $Al_2O_3$ | 1.62 | 5.58 | 1.47 | 0.81 | 1.06 |

EXAMPLE II

A mechanicl concentrate of titanium mineral containing 75.64% of $TiO_2$ and 8.21% of total Fe, with a degree of fineness of 200 mesh, was placed in a rotary kiln and roasted at 750° C. for 60 minutes in an atmosphere of $CO_2$. After this period, the mineral was cooled at 600° C. and kept in a $CO_2$ atmosphere. After the temperature of 600° C. was reached, the mineral was reduced in a flow of reducing gas containing 60% of N, 14% of $CO_2$, and 24% of CO during a period of 45 minutes. The resultant material was subjected to magnetic separation in humid medium in a field of 800 gauss, which produced two fractions, one, magnetic, 10f% of the original feed, containing 42.4% of $TiO_2$ and 31.98% of total Fe, and the other, non-magnetic, with 79.27% of $TiO_2$ and 5.22% of total Fe. The proportion of $TiO_2$ recovered in this separation process amounted to 94.3% of $TiO_2$.

The non-magnetic fraction was leached with HCl 200 g/l at 104° C., under stirring, for four hours. After this operation the concentrate was separate in the liquid phase by filtration and washed with water by decantation after removal of the acid.

The separated concentrate was treated with a solution of sodium hydroxide at 2% and then washed with acid until removal of the alkali. The results obtained are given in this following table:

TABLE 2

|  | Mechanical concentrate | Magnetic fraction | Non-magnetic fraction | Leached with HCl | Neutralization with NaOH |
|---|---|---|---|---|---|
| $TiO_2$, % | 75.64 | 42.48 | 79.27 | 89.93 | 93.26 |
| Total Fe, % | 8.21 | 31.98 | 5.22 | 2.01 | 1.99 |
| $P_2O_5$,% | 2.11 | 0.55 | 2.07 | 2.10 | 0.22 |
| $SiO_2$,% | 0.52 | 0.09 | 0.49 | 0.48 | 0.46 |
| CaO,% | 1.12 | 2.20 | 1.06 | 0.25 | 0.27 |
| MgO, % | 0.50 | 0.90 | 0.47 | 0.08 | 0.05 |
| $Al_2O_3$,% | 2.88 | 4.00 | 2.72 | 1.50 | 1.41 |

The examples given above are provided as exemplary for persons skilled in the art but are by no means intended as limitations of the invention.

What is claimed is:

1. A process for the concentration of titanium containing anatase ore comprising:
    (a) calcining the said anatase ore in a non-reducing atmosphere at a temperature below that of rutilization;
    (b) cooling said calcined ore;
    (c) reducing the cooled ore in a reducing atmosphere at temperatures between 400° C. and 600° C.;
    (d) cooling the reduced ore to below 200° C. in an atmosphere to prevent reoxidation;
    (e) subjecting the reduced ore to magnetic separation to produce a concentrated titanium containing non-magnetic fraction;
    (f) subjecting the non-magnetic fraction to mineral acid leach to remove additional impurities; and
    (g) neutralizing and washing said acid leached fraction to produce a concentrated titanium fraction.

2. The process of claim 1 wherein said calcination is carried out at a temperature below 900° C.

3. The process of claim 1 wherein said reduction is effected in an atmosphere containing at least 10% of reducer gas.

4. The process of claim 1 wherein said magnetic separation is effected in a magnetic field in the range of from 400 to 1500 gauss.

* * * * *